March 27, 1962  A. R. HOWELL ET AL  3,027,138

TURBINE BLADES

Filed Dec. 4, 1952

Inventor
ALUN RAYMOND HOWELL AN.
LEONARD ISLIP
By
his Attorneys

United States Patent Office 3,027,138
Patented Mar. 27, 1962

3,027,138
TURBINE BLADES
Alun Raymond Howell and Leonard Islip, Farnborough, England, assignors to Power Jets (Research and Development) Limited, London, England, a British company
Filed Dec. 4, 1952, Ser. No. 324,028
Claims priority, application Great Britain Dec. 10, 1951
4 Claims. (Cl. 253—77)

This invention relates to elastic fluid turbines and to turbine-bladed compressors but is more particularly applicable to the latter. Vibrations set up in the blades of such machines under the action of the dynamic forces thereon can give rise to dangerously high stresses in the blades and even to fracture of blades; the object of the present invention is a construction which will afford considerable damping within the blade itself.

It has been proposed in copending U.S.A. Patent application Serial No. 304,975 filed August 18, 1952, now Patent 2,917,274, to provide a damping by dividing a blade chordwise into laminations after the fashion of a laminated spring. The present invention is based on the same principle as the proposal in the aforesaid patent application.

According to the present invention a hollow tubular blade is provided with a leaf spring anchored at one end and having its other end inside the blade, bearing against the internal wall. The spring may be attached to the blade root.

One particular form of the invention as applied to a blade-supporting element such as a rotor is shown in the accompanying drawings, FIGURES 1 to 3, of which:

Figure 1:
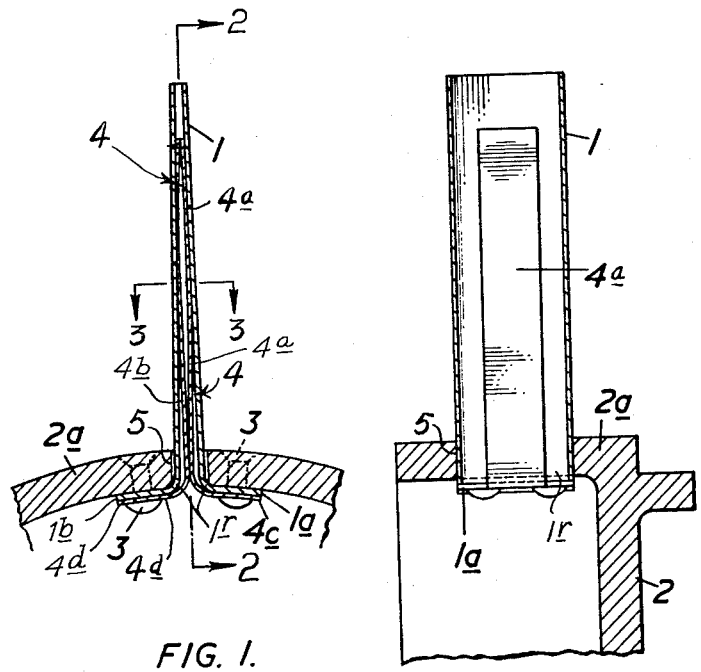
FIGURE 1 is a section, in the plane of rotation, through the middle of a blade in position on a rotor rim.
Figure 2:
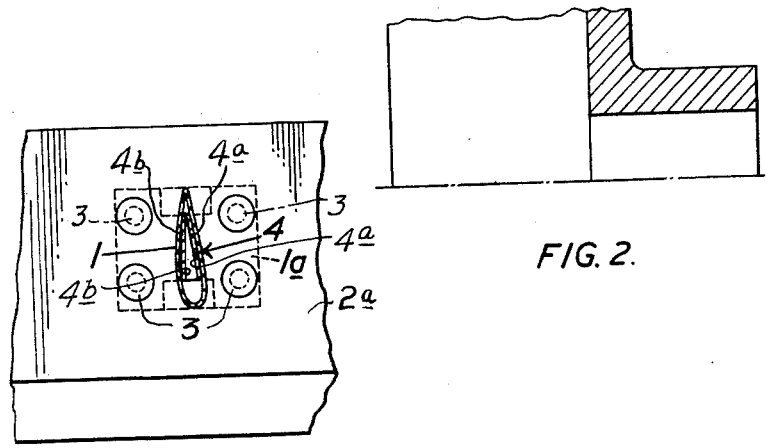
FIGURE 2 is a section on the plane 2—2 of FIGURE 1 through half the diameter of one stage of the rotor.
Figure 3:
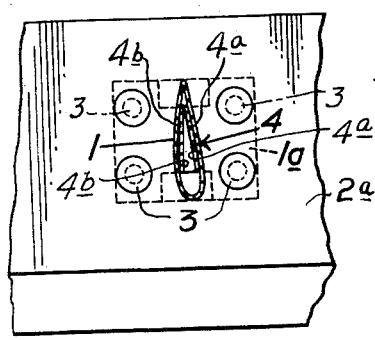
FIGURE 3 is a radial section through the blade on the plane 3—3 in FIGURE 1.

A hollow tubular blade 1, which may be of sheet metal, has at its inner end a root portion indicated generally at 1r which includes integral flanges 1a and 1b which extend in the circumferential direction of the rotor on both sides of the blade 1. The blade 1 projects radially from the root portion 1r through a clearing slot in the peripheral flange 2a of a blade-supporting element such as a cast or forged rotor wheel 2. The flanges 1a and 1b bear against the inside surface of the flange 2a which holds the blade against centrifugal force, and are fixed thereto by rivets 3.

Inside the blade is a leaf spring assembly 4 in the form of two limbs 4a and 4b extending along the blade, each bearing on one of the internal walls of the blade near to the blade tip. At the other end, each limb 4a and 4b of the spring assembly has a bent over end, 4c and 4d, which is attached to the root portion 1r of the blade 1 and the flange 2a by the rivets 3.

It will be understood that the application of the invention, whereby the spring exerts pressure on the internal surface of the blade, is not restricted to the particular method of securing the blade and spring shown in the drawing nor to a rotor blade.

In operation, as fluctuating forces on the sides of the blade cause variable deflections, the spring rubs against the blade wall and damps out any vibration which might ensue.

We claim:

1. In a turbo-machine, a blade-supporting element and a vibration-damped blade thereon comprising a hollow blade secured to said element in combination with a bifurcated leaf spring assembly directly, rigidly secured at one end to said element, the limbs of said bifurcated leaf spring assembly extending along the interior of said blade and being biased so as to exert spring pressure in opposite directions against the internal surface of said hollow blade.

2. In a turbo-machine, a blade-supporting element and a vibration-damped blade comprising an elongated hollow blade having a root portion, flanges on the root portion of said blade extending laterally therefrom and rigidly secured to said element, a leaf spring having a limb portion extending within said hollow blade and bearing with spring pressure on the internal surface thereof, said spring having a bent over end portion rigidly secured to said element.

3. In a turbo-machine, a blade supporting element, a vibration damped blade supported by said element, said blade comprising an elongated hollow body having a root portion, means rigidly connecting said root portion to said element, a leaf spring having a bent over portion disposed adjacent said element and limbs extending from said bent over portion within said blade body, and means rigidly securing said bent over portion to said element, the limbs bearing with spring pressure on, but being otherwise unconnected to, the interior surface of the hollow blade body.

4. In a turbo-machine, a blade supporting element and a vibration damped blade supported by said element according to claim 3, in which said means rigidly connecting said root portion to said element also secures said bent over portion of said spring to said element.

References Cited in the file of this patent

UNITED STATES PATENTS

| 1,833,754 | Paget | Nov. 24, 1931 |
| 2,364,635 | Hasler | Dec. 12, 1944 |
| 2,468,461 | Price | Apr. 26, 1949 |
| 2,559,131 | Oestrich, et al. | July 3, 1951 |
| 2,581,193 | Le Compte | Jan. 1, 1952 |
| 2,642,263 | Thorp | June 16, 1953 |
| 2,656,146 | Sollinger | Oct. 20, 1953 |
| 2,783,023 | Stalker | Feb. 26, 1957 |

FOREIGN PATENTS

| 657,225 | Great Britain | Sept. 12, 1951 |